(12) United States Patent
Yokota

(10) Patent No.: US 6,385,538 B1
(45) Date of Patent: May 7, 2002

(54) METHOD OF SWITCHING GUIDE MODE IN NAVIGATION SYSTEM

(75) Inventor: Tatsuo Yokota, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 09/583,437

(22) Filed: May 31, 2000

(51) Int. Cl.7 .......................... G01C 21/00; G08G 1/123
(52) U.S. Cl. ........................................ 701/211; 340/995
(58) Field of Search .............................. 701/211, 212; 340/995

(56) References Cited

U.S. PATENT DOCUMENTS 5,371,497 A * 12/1994 Nimura et al. .............. 340/995
5,638,279 A * 6/1997 Kishi et al. .................. 364/443
5,911,775 A * 6/1999 Tanimoto ..................... 701/210
6,052,645 A * 4/2000 Harada ........................ 701/212
6,076,041 A * 6/2000 Watanabe .................... 701/211

* cited by examiner

Primary Examiner—Michael J. Zanelli
(74) Attorney, Agent, or Firm—Brinks Hofer Gilson & Lione

(57) ABSTRACT

The navigation system initializes a route guide by a map guide mode or a route guide by an arrow guide mode, and appropriately switches the guide mode to execute route guidance for a vehicle, wherein, when a predetermined condition occurs while guiding the vehicle by a guide mode different from an initialized guide mode, the system automatically switches the guide mode into the initialized guide mode.

18 Claims, 14 Drawing Sheets

― GUIDE ROUTE
• NODE

| ADDRESS | | INTERSECTION FLAG |
|---|---|---|
| F000 | DEPARTURE POINT DATA (NODE Ns) | |
| F001 | NODE N1 | "0" |
| F002 | NODE N2 | "0" |
| ⋮ | ⋮ | "0" ⋮ "0" |
| | NODE Nd-2 | "1" |
| | NODE Nd-1 | "1" |
| | DESTINATION DATA (NODE Nd) | "1" |

Basic Guidance Display
(Arrow Guide Mode)

Detailed Map Display
(Map Guide Mode)

METHOD OF SWITCHING GUIDE MODE IN NAVIGATION SYSTEM

BACKGROUND OF THE INVENTION

The present invention relates to a method of switching a guide mode in a navigation system that initializes a route guide by a map guide mode or a route guide by an arrow guide mode, and executes route guidance for a vehicle while appropriately switching the guide modes.

A navigation system for providing travel guidance to a driver whereby the driver can smoothly reach a desired destination detects the position of the vehicle, and reads map data for the vicinity around the vehicle position from a map storage medium, such as a CD-ROM, DVD, etc. In the Map Guide Mode, the navigation system draws the map and the guide route on the display screen, and superimposes a vehicle position mark on a specific place on the map. As the present position of the vehicle changes according to the movement of the vehicle, the system moves the vehicle position mark along the guide route on the screen, or scrolls the map with the vehicle position mark fixed at a specific position, so that the driver can grasp at a glance the detailed map and the guide route around the vehicle position.

In the Arrow Guide Mode, a guide route and roads intersecting the guide route, etc., are displayed in a simplified manner; the travel direction at an intersection is displayed with an arrow; the distance to the intersection, the direction to the destination, and the distance to the destination, etc., are displayed; and, further, the travel direction at the intersection is guided by a voice instruction.

In addition to the above, the map display mode includes the Hybrid Guide Mode that combines the Map Guide Mode and the Arrow Guide Mode. In the Hybrid Guide Mode, route guidance is executed normally by the Map Guide Mode, and when the vehicle approaches an intersection, the system executes route guidance by the Arrow Guide Mode. After the vehicle passes the intersection, the system recovers the initialized Map Guide Mode to execute route guidance.

FIG. 14 illustrates a method of initializing a route guide, from among the Map Guide Mode/Arrow Guide Mode/Hybrid Guide Mode. Operating the menu key on the remote control unit, the navigation system displays the main menu on the display screen (refer to FIG. 14(a)), and the user selects the menu "Setup" from the main menu. Then, the navigation system displays the "Guidance Setup" menu for specifying the guide mode as shown in FIG. 14(b). Next, if the user selects the menu "Guidance", the navigation system displays the menu "Hybrid", "Arrow", and "Map", and the user selects a desired mode for the route guide. Thus, the initialization is completed. After completing the initialization of a guide mode, an operation of the MP/RG key on the remote control unit will appropriately switch the display mode in a cyclic manner as Map Guide Mode→Arrow Guide Mode, Arrow Guide Mode→Map Guide Mode, as shown in FIG. 15. FIG. 15(a) illustrates a display screen for the Arrow Guide Mode, and FIG. 15(b) illustrates a display screen for the Map Guide Mode.

In a conventional navigation system, when the user switches the guide mode by pressing the MP/RG key in an attempt to view and check the map display for a different guide mode, the guide mode value that has been initialized by the Setup menu is overridden thereafter, and the mode is switched into another guide mode. For example, in the case of the Map Guide Mode having been initialized, if the user presses the MP/RG key near a point of intersection to switch the mode into the Arrow Guide Mode, the navigation system will be switched into the Arrow Guide Mode thereafter.

Accordingly, the user needs to press the MP/RG key once again in order to recover the original guide mode that the user has set for a preference. In other words, when the user switches the guide mode by pressing the MP/RG key in order to see the map display for a different guide mode, the conventional navigation system will not recover the original guide mode set up in the "Map" or "Arrow" mode, which is a problem that makes operation of the system troublesome.

SUMMARY OF THE INVENTION

The present invention has been made in view of the above problem, and it is an object of the invention to provide a method of switching the guide mode such that, when the guide mode is switched by the MP/RG key from the initialized guide mode into another guide mode, the system automatically recovers the initialized guide mode when a predetermined condition occurs.

In the method of switching a guide mode in a navigation system according to the invention, when a user initializes a route guide by the Map Guide Mode or a route guide by the Arrow Guide Mode, and executes the route guide for a vehicle by switching the guide mode, the foregoing object can be accomplished by automatically recovering the initialized guide mode when the predetermined condition occurs while in a guide mode different from the initialized guide mode.

In the following cases (1)–(4), the predetermined condition is judged to exist. That is:

(1) in the case of the initialized guide mode being the Arrow Guide Mode,
  (a) when the vehicle deviates from the guide route and thereafter returns to the guide route, or
  (b) when the vehicle deviates from the guide route, and thereafter returns to the guide route, and the guide point of an intersection and the guide contents (right-turn, etc.) are different from those before deviating from the route, the predetermined condition is judged to exist. In these cases, the system automatically switches the guide mode from the Map Guide Mode into the Arrow Guide Mode.

(2) in the case of the initialized guide mode being the Arrow Guide Mode, when the vehicle approaches the point of intersection, the predetermined condition is judged to exist. In this case, the system automatically switches the guide mode from the Map Guide Mode into the Arrow Guide Mode.

(3) in the case of the initialized guide mode being the Map Guide Mode,
  (a) when the vehicle deviates from the guide route, or
  (b) when the vehicle deviates from the guide route and thereafter returns to the guide route, and the guide point of an intersection and the guide contents (right-turn, etc.) are different from those before deviating from the route, the predetermined condition is judged to exist.

In these cases, the system automatically switches the guide mode from the Arrow Guide Mode into the Map Guide Mode.

(4) in case of the initialized guide mode being the Map Guide Mode, when the vehicle passes the point of intersection, the predetermined condition is judged to exist. In this case, the system automatically switches the guide mode from the Arrow Guide Mode into the Map Guide Mode.

Other features and advantages of the present invention will be apparent from the following description taken in conjunction with the accompanying drawings.

BRIEF DESCRIPTION OF THE DRAWINGS

DESCRIPTION OF THE PREFERRED EMBODIMENTS (A) Configuration of the Navigation System FIG. 1 is a block diagram of a navigation system according to the invention, in which 11 signifies a map storage medium that contains map information, for example, a CD-ROM, 12 a CD-ROM controller that controls the reading of map information from the CD-ROM, 13 a position measuring device that measures a present vehicle position, which includes a speed sensor to detect a travel distance, a gyro to detect a travel orientation, a CPU for position calculation, and a GPS receiver, etc. Further, 14 signifies map information memory to store map information read from the CD-ROM, 15 a guide route memory to store a searched guide route information, and 16 a voice guide unit that guides the traveling direction at a point of intersection with a voice output. In the guide route memory 15, the position data (longitude/latitude) of all the nodes Ns, Ni (i=1, 2, . . . ), Nd which are located on the searched guide route IRT (refer to FIG. 2) and the flags to indicate the types of the intersections are stored from the point of departure to the destination, as shown in FIG. 3.

Figure 4:
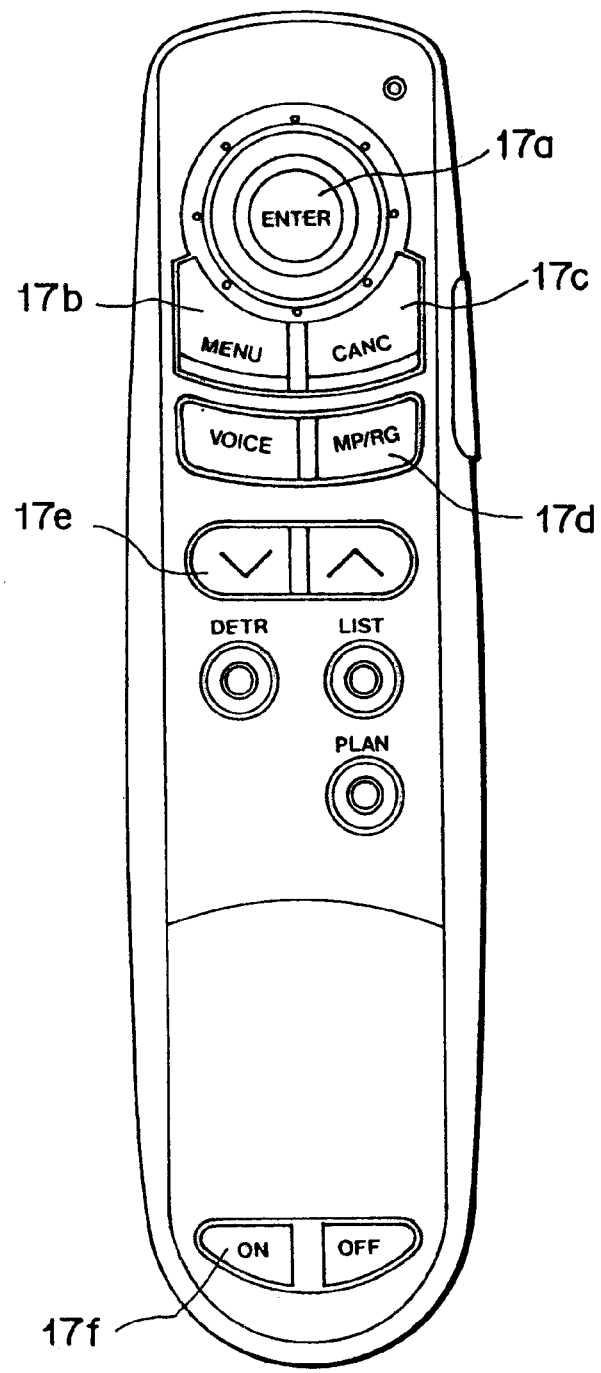
FIG. 4 illustrates a remote control unit.

17 denotes a remote control unit that performs the operations of menu selection, expansion/contraction, destination input, etc., and 18 is a remote control interface. The remote control unit 17 includes, as shown in FIG. 4, a joy stick/enter key 17a, menu key 17b, cancel key 17c, MP/RG key 17d, zoom/scroll key 17e, monitor on/off key 17f, etc. The joy stick/enter key 17a has a function as the joy stick key that moves the cursor and vehicle mark, etc., in eight directions relative to the map, or moves the menu bar (highlight position) when selecting a desired menu, and a function as the enter key to be pressed down for the setting of a cursor position, or for the selection of a menu. The menu key 17b is operated to display the main menu, the cancel key 17c is operated to cancel the current display or to recover the previous display of the menu. The MP/RG key 17d is operated to switch the Map Guide Mode and the Arrow Guide Mode, and the zoom/scroll key 17e is operated to perform expansion/reduction of a map, and up/down shifting or scrolling of a highlight position in various lists.

Figure 1:
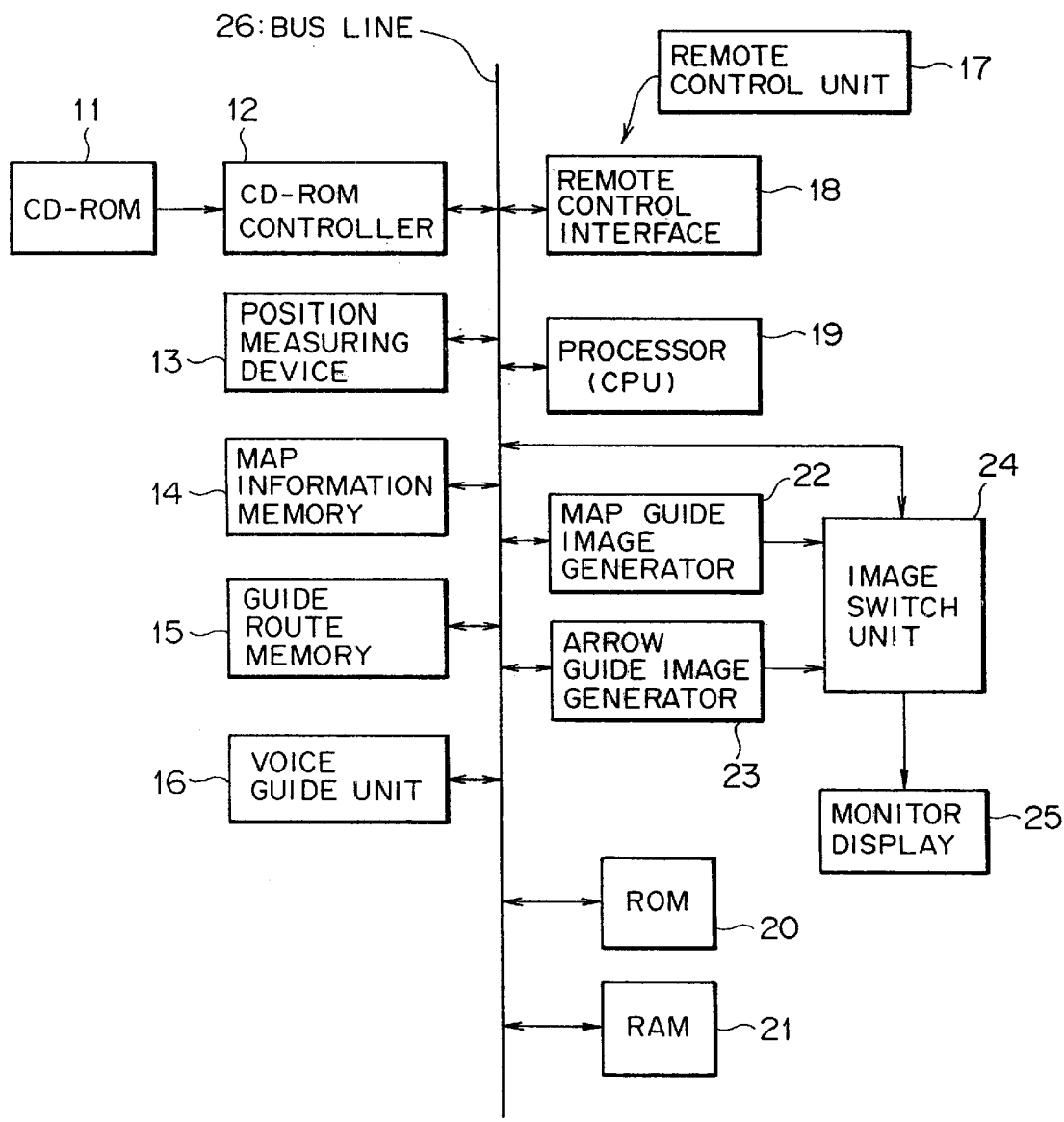
FIG. 1 is a block diagram of a navigation system according to the present invention.
Figures 2, 3:
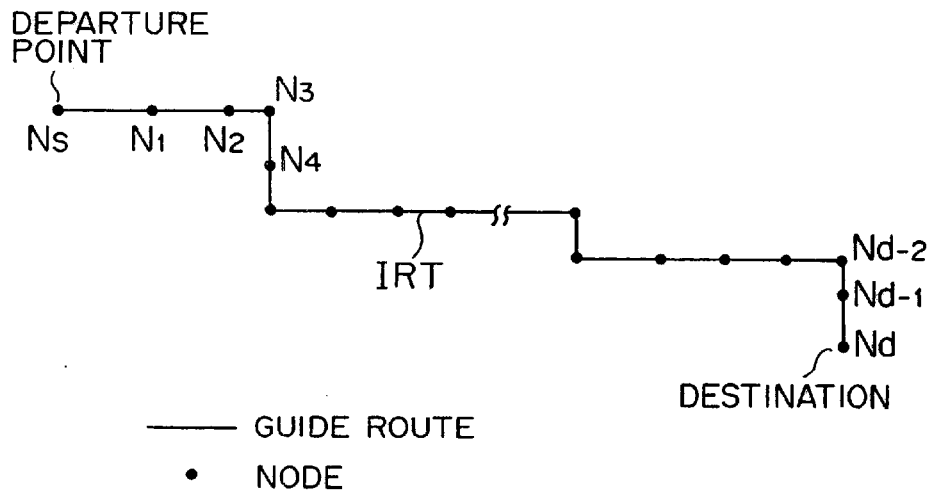
FIG. 2 is a chart to explain the sequence of nodes that constitutes a guide route.
FIG. 3 is a chart to explain the guide route data stored in the guide route memory.

To return to FIG. 1, 19 denotes a processor (CPU) that controls the entire navigation system, 20 is a ROM that stores various programs such as a guide route search program, a guide mode switch program, etc., and 21 is a RAM that stores processed results, etc. Further, 22 signifies a Map Guide image generator that generates a Map Guide image in accordance with the map information and guide route data, 23 is an Arrow Guide image generator that generates an Arrow Guide image in accordance with the same information, 24 is an image switch unit that selects one of the Map Guide image and the Arrow Guide image and outputs the one selected, 25 is a monitor display, and 26 is a bus line.

Figure 5:
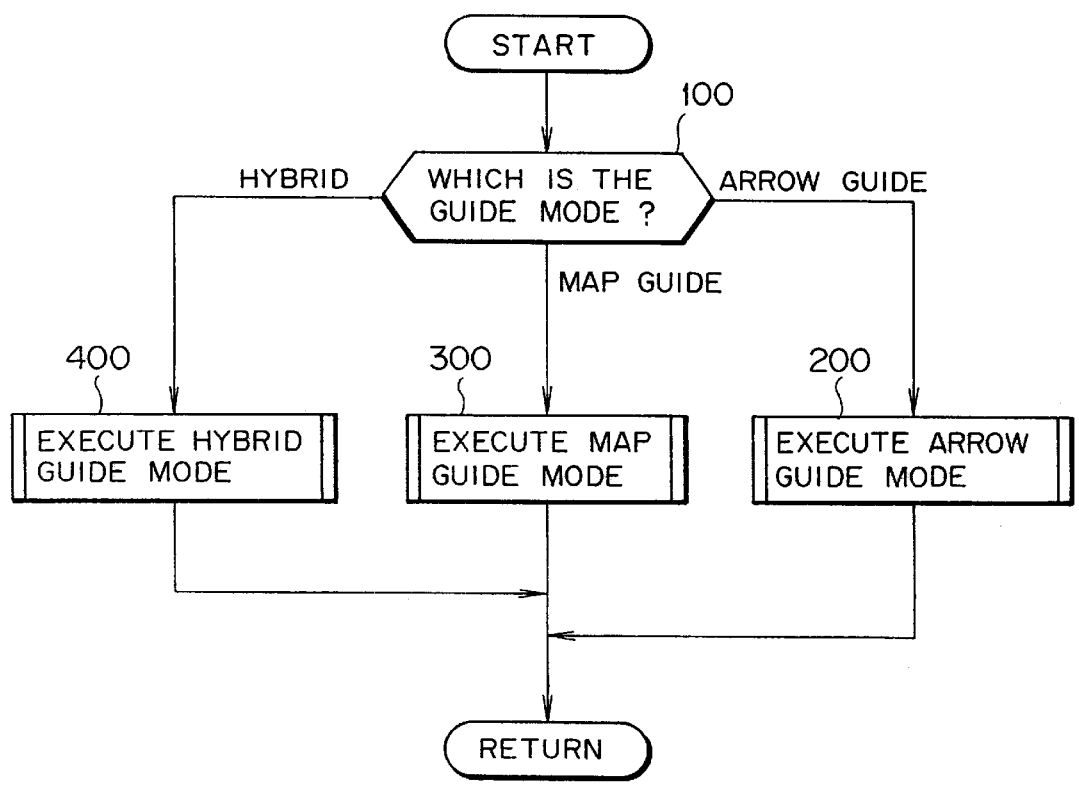
FIG. 5 illustrates a processing flow of the method of switching the guide mode according to the invention.

(B) Switch Processing of the Guide Mode (a) Overall Switch Processing of the Guide Mode FIG. 5 illustrates the overall processing flow in a method of switching the guide mode according to this invention. The CPU 19 of the navigation system checks if the initialized guide mode is the Hybrid Guide Mode, Map Guide Mode, or Arrow Guide Mode (step 100). If it is the Arrow Guide Mode, the processing for the Arrow Guide Mode is executed (step 200); if it is the Map Guide Mode, the processing for the Map Guide Mode is executed (step 300); and if it is the Hybrid Guide Mode, the processing for the Hybrid Guide Mode is executed (step 400).

(b) Display Processing in the Arrow Guide Mode

Figure 6:
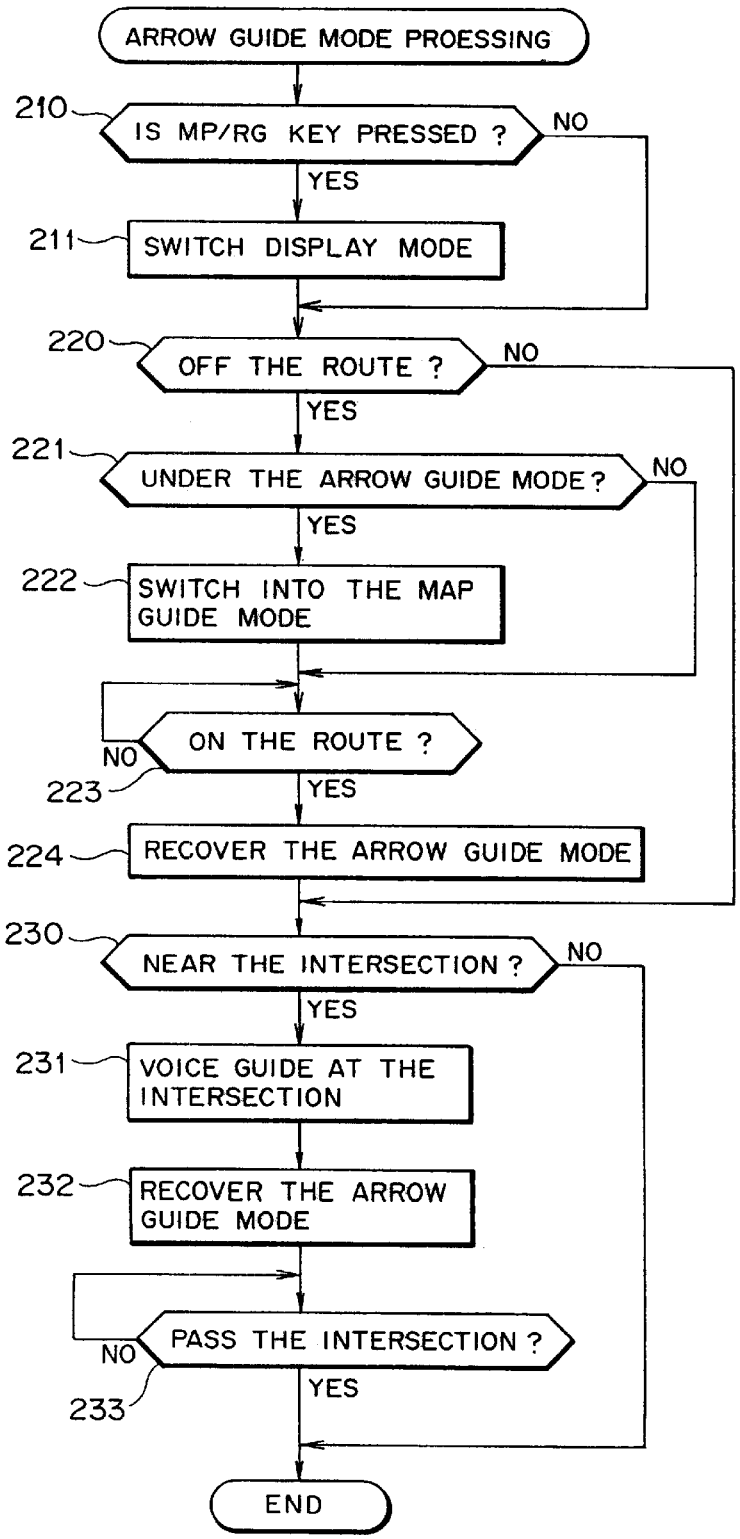
FIG. 6 illustrates a display processing flow in the Arrow Guide Mode.

FIG. 6 illustrates the display processing flow in the Arrow Guide Mode, and FIG. 7 is a chart to explain the switching of the Arrow Guide Mode/Map Guide Mode in the Arrow Guide Mode.

In the Arrow Guide Mode or the Map Guide Mode, the MP/RG key 17d of the remote control unit is checked as to whether it is pressed or not (step 210); if it is not pressed, the vehicle is checked as to whether it is off the route or not (step 220). To be off the route means that the vehicle travel is deviating from the searched guide route. If the vehicle is not off the route, it is checked by referring to the guide route data whether the vehicle has arrived close to an intersection or not (step 230). If it has not arrived close to an intersection, the processing is repeated from the beginning.

Figure 7A:
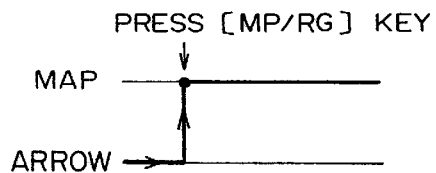
FIG. 7 is a chart to explain the switching of the Arrow/Map Guide Mode in the Arrow Guide Mode.
Figure 7B:
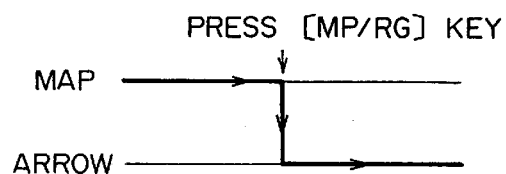
Figure 7C:
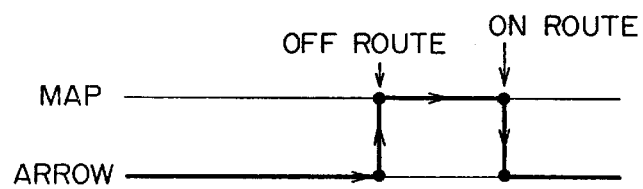

At step 210, if the MP/RG key 17d is pressed down, the guide mode is switched from the Arrow Guide Mode into the Map Guide Mode, or from the Map Guide Mode into the Arrow Guide Mode (step 211, refer to FIG. 7(a), FIG. 7(b)). And then, whether the vehicle is off the route is checked (step 220). If it is not off the route, whether the vehicle has arrived close to an intersection is checked by referring to the guide route data (step 230). If it is off the route, whether the mode is now under the Arrow Guide Mode is checked (step 221), and if it is under the Arrow Guide Mode, it is automatically switched into the Map Guide Mode (step 222, refer to FIG. 7(c)). This switching is executed because, once the vehicle is off the route, the arrow guide image used until then, based on the guide route data, becomes inappropriate.

Figure 7D:
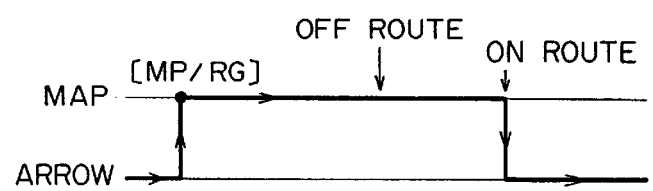
Figure 7E:
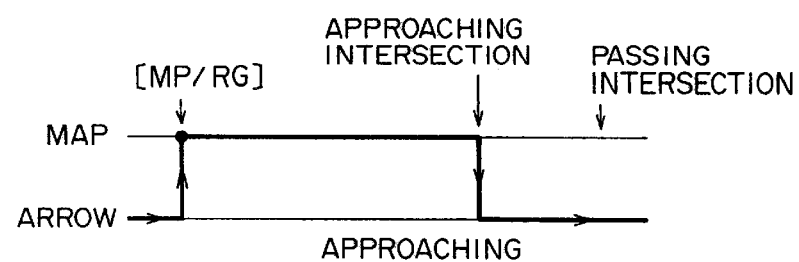
Figure 7F:

At step 222, if the guide mode is switched into the Map Guide Mode, or at step 221, if it is under the Map Guide Mode (FIG. 7(d)), whether the vehicle gets on the route, namely whether the route to the destination is searched again, or whether the vehicle returns to the original guide route is checked (step 223). If it is on the route, assuming that the condition to recover the initialized mode is complete, the guide mode is automatically switched from the Map Guide Mode into the Arrow Guide Mode (step 224, refer to FIG. 7(c), FIG. 7(d)).

Next, whether the vehicle has arrived close to an intersection is checked (step 230), and if it has not arrived close to an intersection, returning to the initial step, the system repeats the processing. However, if the vehicle has arrived close to the intersection, the travel direction at the intersection is guided by voice output (step 231). Further, if the vehicle approaches an intersection, assuming that the condition to recover the initialized mode is complete, in the case of the mode being the Map Guide Mode, the guide mode is automatically switched into the Arrow Guide Mode (step 232, refer to FIG. 7(e), FIG. 7(f)). This switching is based on the premise that, near an intersection, the Arrow Guide Mode is normally used to indicate the travel direction by an arrow and with voice output which is more convenient to the driver.

Thereafter, whether the vehicle has passed the intersection is checked (step 233), and if it has passed the intersection, the system continues guidance with the Arrow Guide Mode being the initialized mode.

Thus, in case of the initialized guide mode being the Arrow Guide Mode, (1) when the vehicle deviates from the guide route, and thereafter the route to the destination is searched again, or the vehicle returns to the original guide route, the condition to recover the initialized mode is judged to be complete, and the guide mode is automatically recovered to the Arrow Guide Mode from the Map Guide Mode. Also, in case of the initialized guide mode being the Arrow Guide mode, (2) when the vehicle comes close to an intersection, the condition to recover the initialized mode is judged to be complete, and the guide mode is automatically recovered to the Arrow Guide Mode from the Map Guide Mode.

(b-1) Modified Example

Figure 8:
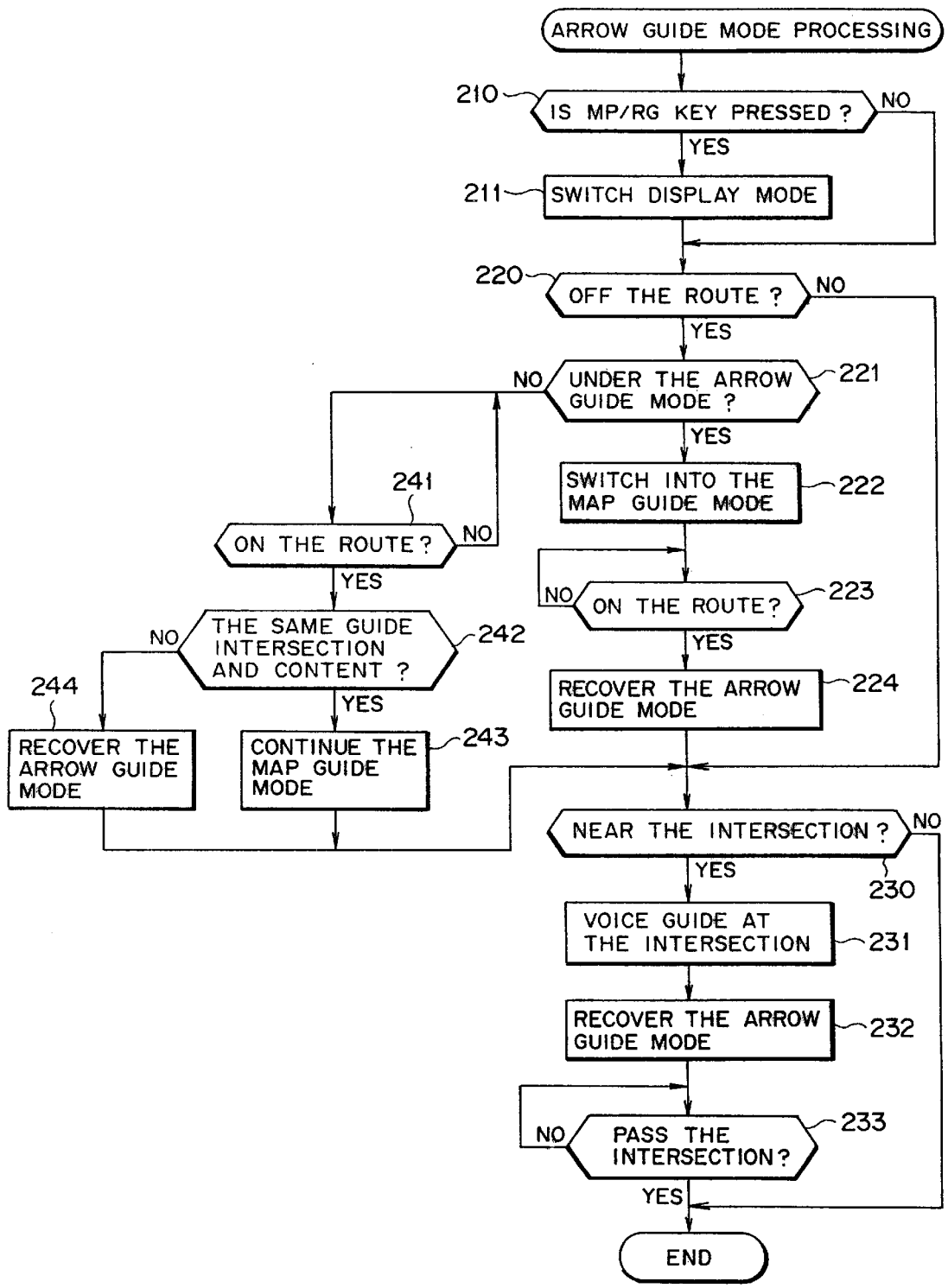
FIG. 8 illustrates a display processing flow in the Arrow Guide Mode in a modified example.

In the above case, when the vehicle deviates from the guide route (off the route), and thereafter the vehicle returns to the original guide route (on the route), it is immediately judged that the condition to recover the initialized mode is complete. However, as in the following, the system can be arranged to determine to, or not to, recover the initialized mode based on the state when the vehicle returns to the guide route. That is, in the case of the initialized mode being the Arrow Guide Mode, and the vehicle is traveling in the Map Guide Mode, (a) When the vehicle has returned to the guide route after getting off the route, if the guide point of intersection or the guide contents (right-turn, etc.) are the same as those before getting off the route, the system continues the Map Guide Mode, (b) When the vehicle has returned to the guide route after getting off the route, if the guide point of intersection or the guide contents (right-turn, etc.) are different from those before getting off the route, the condition to recover the initialized mode is judged to be complete, and the system recovers the Arrow Guide Mode. FIG. 8 illustrates the processing flow of the foregoing modified example, in which the steps 241–244 are added to the processing flow shown in FIG. 6.

The reason to propose the method in the modified example is as follows. Namely, it is not always convenient to the user that the system immediately recovers the Arrow Guide Mode, as in the embodiment in FIG. 6, when the vehicle returns to the original guide route from the state of being off the route for a short period. For example, the following situations (a), (b) can be considered.

(a) A temporary mismatching with a parallel road occurs resulting from the error in determining the vehicle position, and the vehicle immediately returns to the route, (b) In a manual re-searching mode that does not start the route re-searching until the user instructs, the vehicle temporarily makes a detour to avoid an accident or a construction site, and returns to the route within a short period relying on a commercial road map.

In the foregoing situations (a), (b), when the guide intersection and the guide contents (right-turn etc.) are the same as those before being off the route (that is, the point where the vehicle returns to the route is before the expected guide intersection), it may be conceivable that to maintain the Map Guide Mode immediately before deviating from the route is more convenient to the user than to recover the Arrow Guide Mode that was initially set. Specially, in the foregoing situation (a), there is a great possibility that the vehicle deviates and returns to the route before the driver realizes the situation; and the recovery of the initialized mode might give the user the impression that the guide mode has changed without the user's permission, which is undesirable.

When the vehicle returns to a point on the route after the expected guide intersection, the user operates the MP/RG key to recover the initialized mode, since the vehicle has already passed the intersection being the object of the mode change.

Further, when the vehicle gets back to the guide route after executing the re-searching, the system draws a new guide route, which supposedly presents different guide intersections or guide contents in general. In this situation, also, the guide mode used before deviating from the route can be considered to have little meaning, and the system recovers the initialized mode accordingly.

(c) Display Processing in the Map Guide Mode

Figure 9:
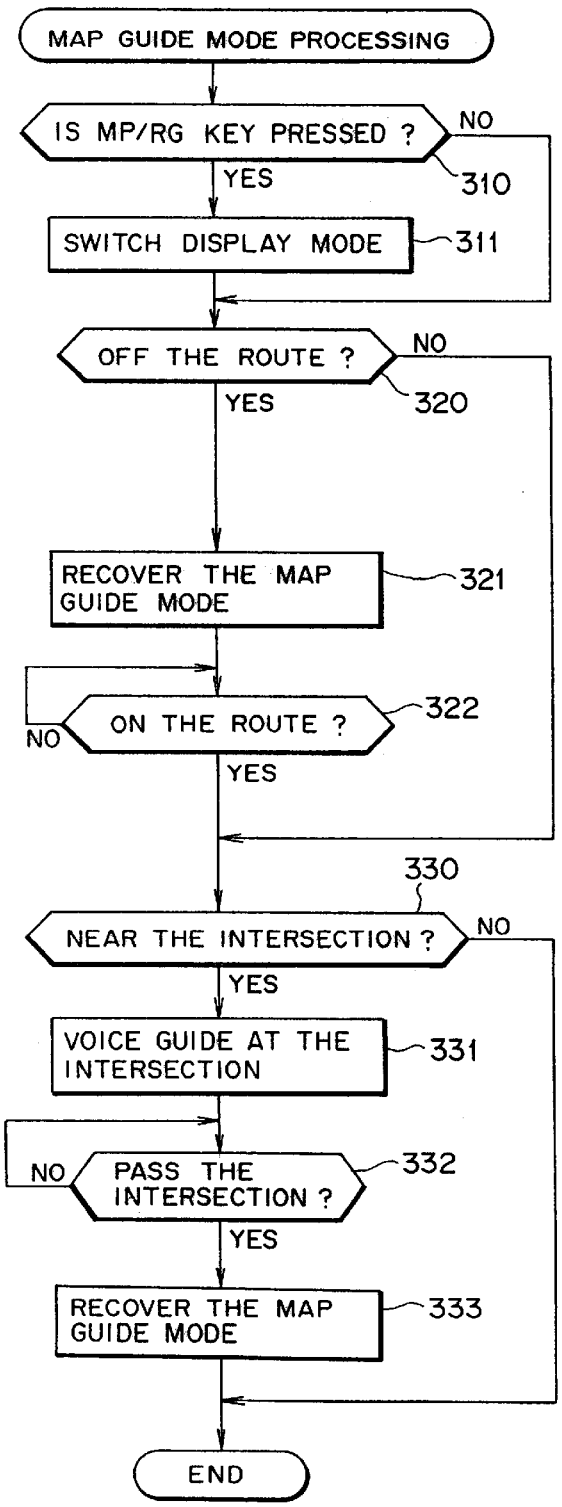
FIG. 9 illustrates a display processing flow in the Map Guide Mode.

FIG. 9 illustrates the display processing flow in the Map Guide Mode, and FIG. 10 illustrates a chart to explain the switching of the Arrow Guide Mode/Map Guide Mode in the Map Guide Mode.

In the Map Guide Mode or the Arrow Guide Mode, whether the MP/RG key 17d of the remote control unit is pressed or not is checked (step 310); if it is not pressed, whether the vehicle is off the route or not is checked (step 320). If the vehicle is not off the route, it is checked by referring to the guide route data whether the vehicle has arrived close to an intersection or not (step 330). If the vehicle has not arrived close to the intersection, the processing is repeated from the beginning.

Figure 10A:
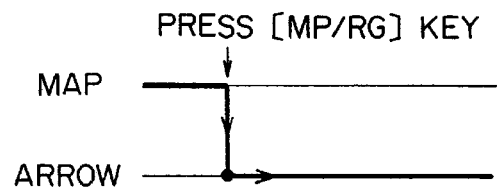
FIG. 10 is a chart to explain the switching of the Arrow/Map Guide Mode in the Map Guide Mode.
Figure 10B:
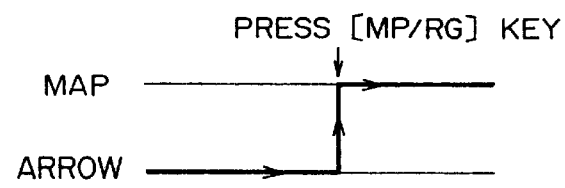
Figure 10C:
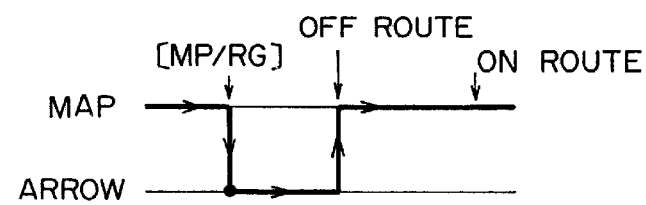
Figure 10D:
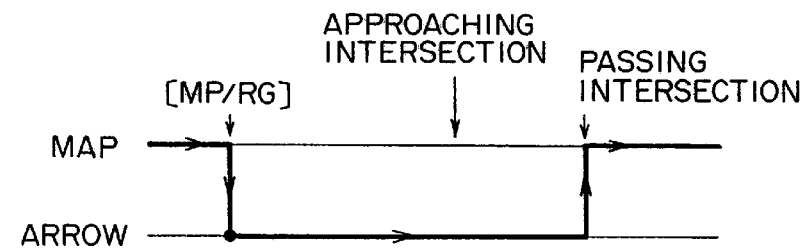
Figure 10E:
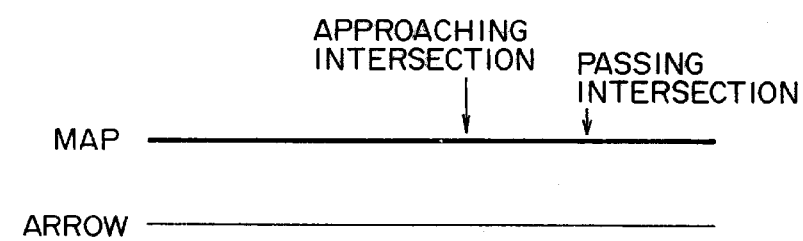

At step 310, if the MP/RG key 17d is pressed down, the guide mode is switched from the Map Guide Mode into the Arrow Guide Mode, or from the Arrow Guide Mode into the Map Guide Mode (step 311, refer to FIG. 10(a), FIG. 10(b)). And then, whether the vehicle is off the route is checked (step 320). If it is not off the route, whether the vehicle has arrived close to an intersection is checked by referring to the guide route data (step 330). If it is off the route, the condition to recover the initialized mode is judged to be complete, namely, the Arrow Guide Mode is judged invalid; and if the mode is now under the Arrow Guide Mode, it is automatically switched into the Map Guide Mode (step 321, refer to FIG. 10(c)).

At step 321, if the mode is switched into the Map Guide Mode, whether the vehicle gets on the route, namely whether the route to the destination is re-searched, or whether the vehicle returns to the original guide route is checked (step 322). If the vehicle is on the route, thereafter the system continues guidance by the Map Guide Mode being the initialized mode.

Next, whether the vehicle has arrived close to an intersection is checked (step 330), and if it has not arrived close to an intersection, returning to the initial step, the system repeats the processing. However, if the vehicle has arrived close to an intersection, the travel direction at the intersection is guided by voice output (step 331), and thereafter, whether the vehicle has passed the intersection is checked (step 332). If it has passed the intersection, the condition to recover the initialized guide mode is judged to be complete, and the guide mode is switched into the Map Guide Mode as the initialized guide mode (step 333, FIG. 10(d), FIG. 10(e)).

Thus, in the case of the initialized guide mode being the Map Guide Mode, (1) when the vehicle deviates from the guide route, the condition to recover the initialized mode is judged to be complete, and the guide mode is automatically recovered to the Map Guide Mode from the Arrow Guide Mode. Also, in the case of the initialized guide mode being the Map Guide Mode, (2) when the vehicle has passed the intersection, the condition to recover the initialized mode is judged to be complete, and the guide mode is automatically recovered to the Map Guide Mode from the Arrow Guide Mode.

(c-1) Modified Example

Figure 11:
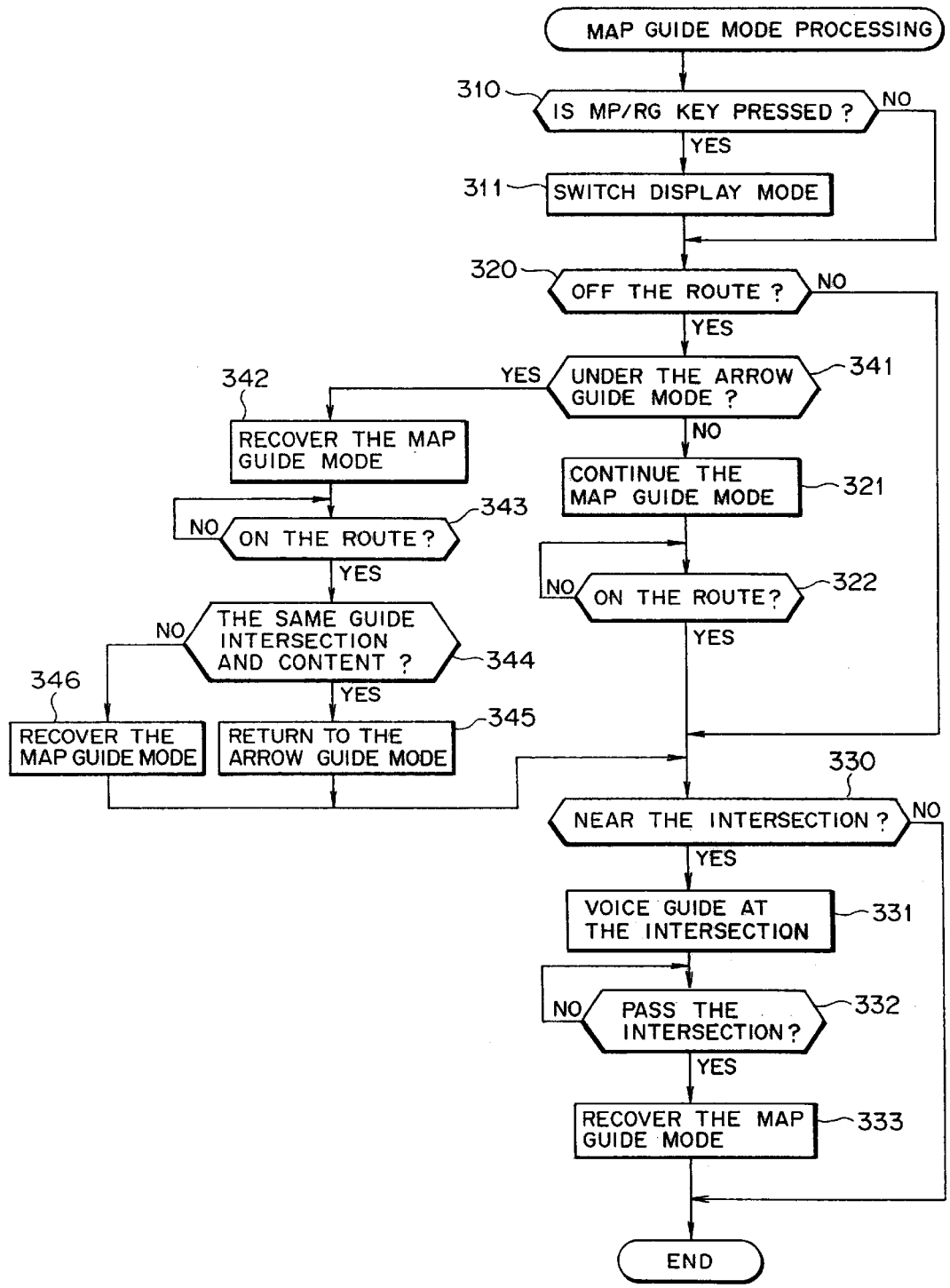
FIG. 11 illustrates a display processing flow in the Map Guide Mode in a modified example.

In the above case, when the vehicle gets back to the guide route at step 322 (on the route), the system is made to guide the route by the Map Guide Mode as the initialized mode. However, as in the following, the system can be arranged to determine to, or not to, recover the initialized mode based on the state when the vehicle returns to the guide route. That is, in the case of the initialized mode being the Map Guide Mode, with the vehicle traveling in the Arrow Guide Mode, when the vehicle deviates from the guide route (off the route) and returns to the map guide indication, and thereafter recovers the guide route (on the route), (a) if the guide point of intersection or the guide contents are different from those before getting off the route, the system guides the vehicle by the Map Guide Mode; on the other hand, (b) if the guide point of intersection or the guide contents are the same as those before getting off the route, the system guides the vehicle by the Arrow Guide Mode used directly before getting off the route. FIG. 11 illustrates the processing flow of the foregoing modified example, in which the steps 341~346 are added to the processing flow shown in FIG. 9.

The reason to propose the method in the modified example is as follows. Namely, it is not always convenient to the user that the system continues the initialized Map Guide Mode, as in the embodiment in FIG. 9, when the vehicle returns to the original guide route from the state of being off the route for a short period. For example, the following situations (a), (b) can be considered.

(a) A temporary mismatching with a parallel road occurs resulting from an error in determining the vehicle position, and the vehicle immediately returns to the route, (b) In a manual re-searching mode that does not start the route re-searching until the user instructs, the vehicle temporarily makes a detour to avoid an accident or a construction site, and returns to the route within a short period relying on a commercial road map.

In these cases (a), (b), when the guide intersection and the guide contents are the same as those before being off the route (that is, the point where the vehicle returns to the route is before the expected guide intersection), it may be conceivable that the recovery of the Arrow Guide Mode immediately before deviating from the route is more convenient to the user than the maintenance of the Map Guide Mode that was initially set. Specially, in the foregoing situation (a), there is a great possibility that the vehicle deviates and returns to the route before the driver realizes the situation; and the maintenance of the Map Guide Mode as the initialized mode might give the user the impression that the guide mode has changed without the user's permission, which is undesirable.

When the vehicle returns to a position on the route after the expected guide intersection, the user operates the MP/RG key to recover the initialized mode, since the vehicle has already passed the intersection being the object of the mode change.

Further, when the vehicle gets back to the guide route after executing the re-searching, the system draws a new guide route, which supposedly presents different guide intersections or guide contents in general. In this situation, also, the guide mode used before deviating from the route can be considered to have little meaning, and the system recovers the initialized mode accordingly.

(d) Display Processing in the Hybrid Guide Mode

Figure 12:
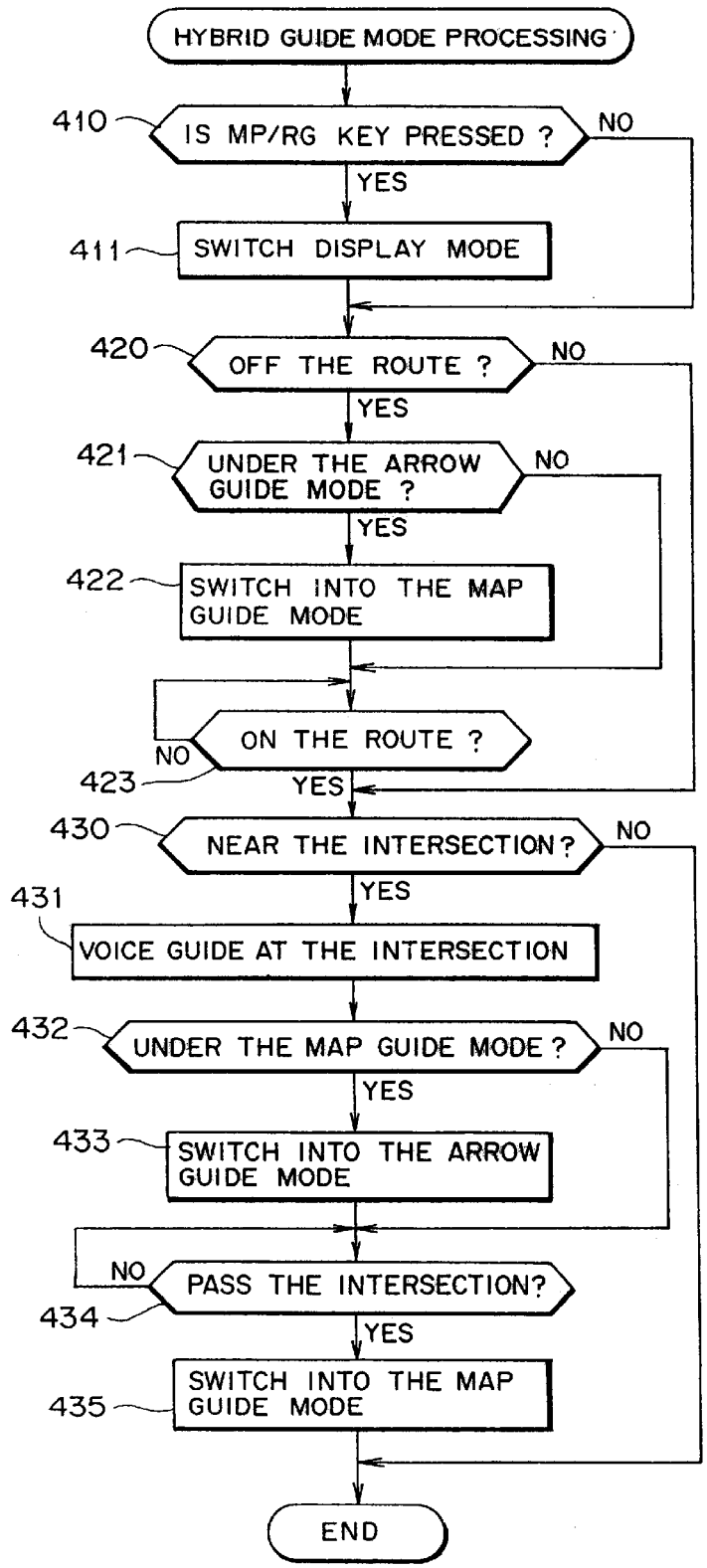
FIG. 12 illustrates a display processing flow in the Hybrid Guide Mode.

FIG. 12 illustrates the processing flow in the Hybrid Guide Mode, and FIG. 13 is a chart to explain the switching of the Arrow Guide Mode/Map Guide Mode in the Hybrid Guide Mode.

In the Arrow Guide Mode or the Map Guide Mode, whether the MP/RG key 17d of the remote control unit is pressed or not is checked (step 410); if it is not pressed, whether the vehicle is off the route or not is checked (step 420). If the vehicle is not off the route, it is checked by referring to the guide route data whether the vehicle has arrived close to an intersection or not (step 430). If the vehicle has not arrived close to an intersection, the processing is repeated from the beginning.

Figure 13A:
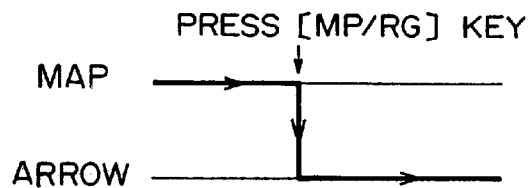
FIG. 13 is a chart to explain the switching of the Arrow/Map Guide Mode in the Hybrid Guide Mode.
Figure 13B:
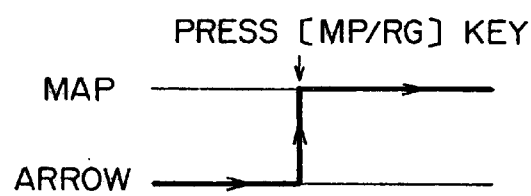
Figure 13C:
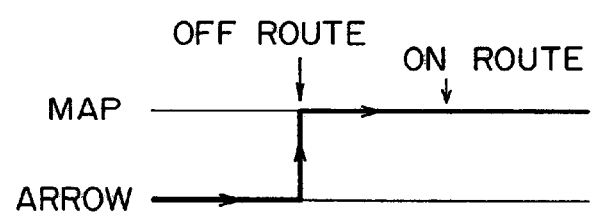
Figure 13D:
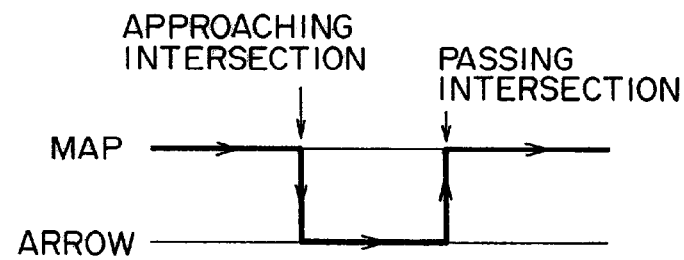
Figure 13E:
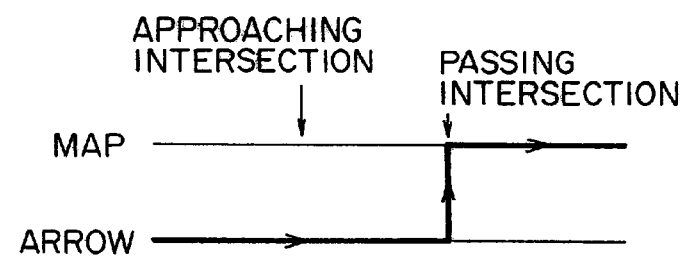
Figure 14A:
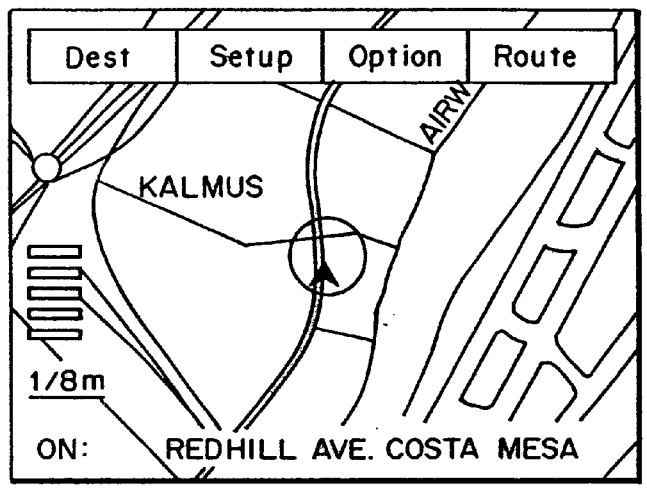
FIG. 14 is a chart to explain the method of initializing the mode for the guidance of a route by selecting any one from the Map Guide Mode/Arrow Guide Mode/Hybrid Guide Mode.
Figure 14B:
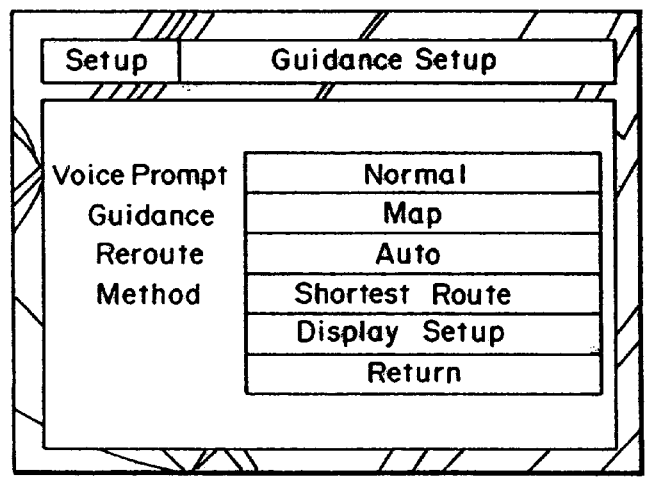
Figure 14C:
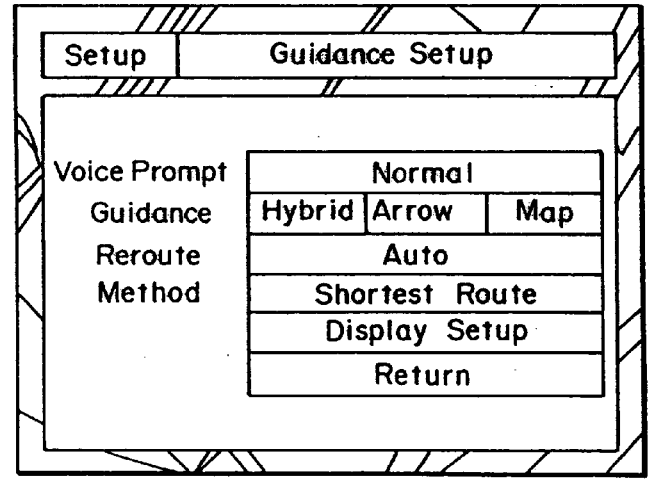
Figure 15A:
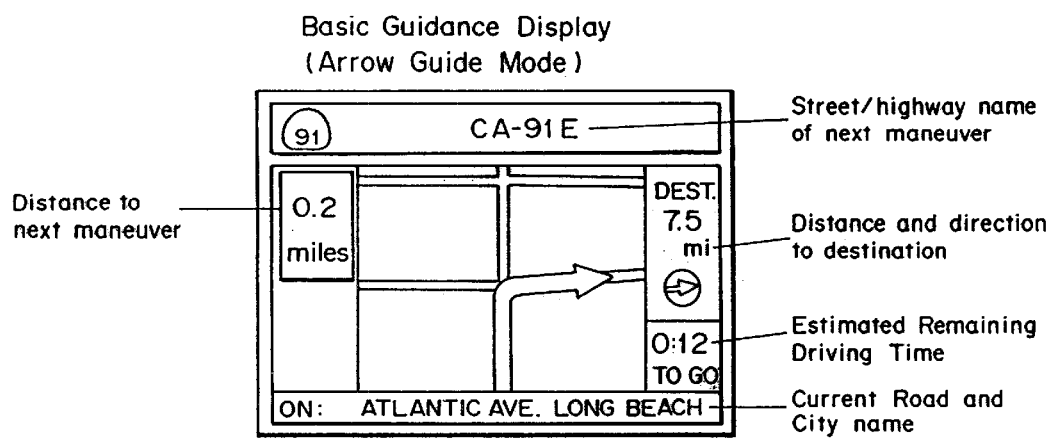
FIG. 15 is a chart to explain the conventional method of switching the guide mode by the MP/RG key.
Figure 15B:
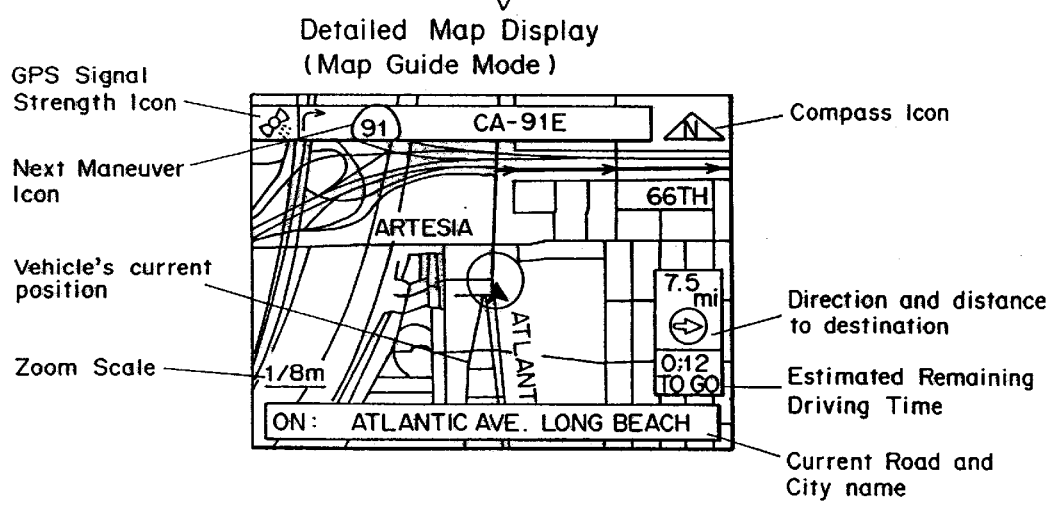

At step 410, if the MP/RG key 17d is pressed down, the guide mode is switched from the Arrow Guide Mode into the Map Guide Mode, or from the Map Guide Mode into the Arrow Guide Mode (step 411, refer to FIG. 13(a), FIG. 13(b)). Then, whether the vehicle is off the route is checked (step 420). If the vehicle is not off the route, whether the vehicle has arrived close to an intersection is checked by referring to the guide route data (step 430). If the vehicle is off the route, whether the mode is now under the Arrow Guide Mode is checked (step 421); and if it is under the Arrow Guide Mode, it is automatically switched into the Map Guide Mode (step 422, refer to FIG. 13(c)). This switching is executed because, once the vehicle is off the route, the arrow guide image used until then, based on the guide route data, becomes inappropriate.

Thereafter, or at step 421, if the mode has already been switched into the Map Guide Mode by the operation of the MP/RG key, or by the automatic switching in the Hybrid mode, whether the vehicle gets on the route, namely whether the route to the destination is re-searched, or whether the vehicle returns to the original guide route is checked (step 423). If it is on the route, thereafter the system continues guidance by the Map Guide Mode.

Next, whether the vehicle has arrived close to an intersection is checked (step 430), and if has is not arrived close to an intersection, returning to the initial step, the system repeats the processing. However, if the vehicle has arrived close to an intersection, the travel direction at the intersection is guided with a voice output (step 431), and whether the mode is under the Map Guide Mode (under display of the detailed map) is checked (step 432). If it is under the Map Guide Mode, the mode is automatically switched into the Arrow Guide Mode (step 433, FIG. 13(*d*)). This switching is executed because, near the intersection generally, the Arrow Guide Mode that displays and informs the travel direction by an arrow and with voice output is more convenient to the driver.

Thereafter, or at step 432, if the current mode is the Arrow Guide Mode, whether the vehicle has passed the intersection is checked (step 434); if it has passed the intersection, the guide mode is switched from the Arrow Guide Mode into the Map Guide Mode (step 435, FIG. 13(*e*)), and thereafter the system continues the processing from step 410.

The Hybrid Guide Mode adopts the following three points as the principle for guiding a vehicle. That is, (1) when the MP/RG key is pressed, the system switches the guide mode to guide a vehicle, (2) if the vehicle approaches an intersection, the system guides the vehicle by the Arrow Guide Mode until the vehicle passes through the intersection, and except in the vicinity of an intersection, the system guides the vehicle by the Map Guide Mode, and (3) while off the route, the system guides the vehicle by the Map Guide Mode.

(d-1) Modified Example

In the above case, if the vehicle gets back on the route at step 423, the system continues the Map Guide Mode, however the system can be arranged as follows. That is, (1) before getting off the route, if the vehicle is traveling in the Arrow Guide Mode, and when the vehicle returns to the guide route, after getting off the route, if the guide intersection or the guide contents (right-turn, etc.) are different from those before deviating from the route, the system guides the vehicle by the Map Guide Mode; on the other hand, (2) before getting off the route, if the vehicle is traveling in the Arrow Guide Mode, and when the vehicle returns to the guide route, after getting off the route, if the guide intersection or the guide contents (right-turn, etc.) are the same as those before deviating from the route, the system guides the vehicle by the Arrow Guide Mode.

Thus, according to this invention, even if the guide mode is switched by the MP/RG key from the initialized guide mode into a different guide mode, when the predetermined condition occurs, the system automatically recovers the initialized guide mode, whereby maneuverability can be enhanced.

As many widely different embodiments of the present invention can be made without departing from the spirit and scope thereof, it is to be understood that the invention is not limited to the specific embodiments thereof except as defined in the appended claims.

What is claimed is:

1. A navigation system that initializes a route guide by a map guide mode or a route guide by an arrow guide mode, and appropriately switches the guide mode to execute route guidance for a vehicle, the navigation system comprising:

a storage means that stores map data, a current position detection means that detects a current position of the vehicle, a means for initializing route guidance by either a map guide mode or an arrow guide mode, a control unit that outputs as travel guide information either of a map guide image and an arrow guide image on the basis of data stored in the storage means and data detected by the current position detection means, and a display unit that displays the travel guide information, wherein the control unit includes a switching means that, when the vehicle approaches a guide point of an intersection with the arrow guide mode being the initialized mode, automatically switches from the map guide image into the arrow guide image on the basis of map data stored in the storage means and the current position detected by the current position detection means.

2. A navigation system that initializes a route guide by a map guide mode or a route guide by an arrow guide mode, and appropriately switches the guide mode to execute route guidance for a vehicle, the navigation system comprising:

a storage means that stores map data, a current position detection means that detects a current position of the vehicle, a means for initializing route guidance by either a map guide mode or an arrow guide mode, a control unit that outputs as travel guide information either of a map guide image and an arrow guide image on the basis of data stored in the storage means and data detected by the current position detection means, and a display unit that displays the travel guide information, wherein the control unit includes a switching means that, when the vehicle passes a guide point of an intersection with the map guide mode being the initialized mode, automatically switches from the arrow guide image into the map guide image on the basis of map data stored in the storage means and the current position detected by the current position detection means.

3. A method of switching a guide mode in a navigation system that initializes a route guide by a map guide mode or a route guide by an arrow guide mode, and appropriately switches the guide mode to execute route guidance for a vehicle, wherein, when a predetermined condition exists and the guide mode is different from an initialized guide mode, the guide mode is automatically switched into the initialized guide mode.

4. A method of switching a guide mode in a navigation system, as claimed in claim 3, wherein, when the vehicle deviates from a guide route with the arrow guide mode being the initialized mode, and thereafter returns to the guide route, a predetermined condition is judged to exist and the guide mode is automatically switched from the map guide mode into the arrow guide mode.

5. A method of switching a guide mode in a navigation system, as claimed in claim 4, wherein, when the vehicle deviates from the guide route with the arrow guide mode being the initialized mode, and thereafter returns to an original guide route, the predetermined condition is judged to exist and the guide mode is automatically switched from the map guide mode into the arrow guide mode.

6. A method of switching a guide mode in a navigation system, as claimed in claim 4, wherein, when the vehicle deviates from the guide route with the arrow guide mode being the initialized mode, and thereafter returns to an original guide route, if the vehicle approaches a guide point of an intersection within a specific distance, the predetermined condition is judged to exist and the guide mode is automatically switched from the map guide mode into the arrow guide mode.

7. A method of switching a guide mode in a navigation system, as claimed in claim 4, wherein, when the vehicle deviates from the guide route, thereafter a route to a destination is re-searched, and the vehicle returns to the route, the guide mode is automatically switched from the map guide mode into the arrow guide mode.

8. A method of switching a guide mode in a navigation system, as claimed in claim 4, wherein, when the vehicle deviates from the guide route, thereafter a route to at least a point of intersection on the guide route is researched, and the vehicle returns to the route, the guide mode is automatically switched from the map guide mode into the arrow guide mode.

9. A method of switching a guide mode in a navigation system, as claimed in claim 3, wherein, when the vehicle deviates from a guide route with the arrow guide mode being the initialized mode, thereafter returns to the guide route, and a guide point of an intersection and guide contents at the moment when the vehicle returns to the guide route are different from those before deviating from the route, the predetermined condition is judged to exist and the guide mode is automatically switched from the map guide mode into the arrow guide mode.

10. A method of switching a guide mode in a navigation system, as claimed in claim 3, wherein, when the vehicle approaches a point of intersection with the arrow guide mode being the initialized mode, the predetermined condition is judged to exist and the guide mode is automatically switched from the map guide mode into the arrow guide mode.

11. A method of switching a guide mode in a navigation system, as claimed in claim 3, wherein, when the vehicle deviates from a guide route while driving with the arrow guide mode, thereafter returns to the guide route, and a guide point of an intersection and guide contents at the time when the vehicle returns to the guide route are the same as those before deviating from the route, the system automatically switches the map guide mode into the arrow guide mode.

12. A method of switching a guide mode in a navigation system, as claimed in claim 3, wherein, when the vehicle deviates from a guide route while driving with the map guide mode, thereafter returns to the guide route, and a guide point of an intersection and guide contents at the time when the vehicle returns to the guide route are the same as those before deviating from the route, the system continues guidance by the map guide mode.

13. A method of switching a guide mode in a navigation system, as claimed in claim 3, wherein, when the vehicle passes a point of intersection with the map guide mode being the initialized mode, the predetermined condition is judged to exist and the guide mode is automatically switched from the arrow guide mode into the map guide mode.

14. A method of switching a guide mode in a navigation system that initializes a route guide by a map guide mode or a route guide by an arrow guide mode, and appropriately switches the guide mode to execute route guidance for a vehicle, wherein, when the vehicle deviates from a guide route and thereafter returns to the guide route, if the guide information for route guidance is the same as that before deviating from the route, the guide mode is automatically switched into the mode existing before deviating from the route, and if the guide information is different from that before deviating from the route, the guide mode is automatically switched into the initialized guide mode.

15. A method of switching a guide mode in a navigation system that initializes a route guide by a map guide mode, as claimed in claim 14, wherein, when the vehicle deviates from a guide route while driving with the arrow guide mode and thereafter returns to the guide route, if the guide information for route guidance is different from that before deviating from the route, the system continues guidance by the map guide mode.

16. A method of switching a guide mode in a navigation system that initializes a route guide by a map guide mode, as claimed in claim 14, wherein, when the vehicle deviates from a guide route while driving with the arrow guide mode and thereafter returns to the guide route, if the guide information for route guidance is the same as that before deviating from the route, the system automatically switches the map guide mode into the arrow guide mode.

17. A method of switching a guide mode in a navigation system that initializes a route guide by an arrow guide mode, as claimed in claim 14, wherein, when the vehicle deviates from a guide route while driving with the map guide mode and thereafter returns to the guide route, if the guide information for route guidance is different from that before deviating from the route, the system automatically switches the map guide mode into the arrow guide mode.

18. A method of switching a guide mode in a navigation system that initializes a route guide by an arrow guide mode, as claimed in claim 14, wherein, when the vehicle deviates from a guide route while driving with the map guide mode and thereafter returns to the guide route, if the guide information for route guidance is the same as that before deviating from the route, the system continues guidance by the map guide mode.

\* \* \* \* \*